United States Patent [19]

Nakayama

[11] Patent Number: 4,873,542
[45] Date of Patent: Oct. 10, 1989

[54] AUTO-FOCUS CAMERA

[75] Inventor: Haruki Nakayama, Hachioji, Japan

[73] Assignee: Konica Corporation, Tokyo, Japan

[21] Appl. No.: 239,369

[22] Filed: Sep. 1, 1988

[30] Foreign Application Priority Data

Sep. 4, 1987 [JP] Japan .............................. 62-221349
Sep. 4, 1987 [JP] Japan .............................. 62-221350

[51] Int. Cl.⁴ .............................................. G03B 3/00
[52] U.S. Cl. ................................ 354/400; 354/195.1; 354/286
[58] Field of Search ...................... 354/400, 286, 195.1

[56] References Cited

U.S. PATENT DOCUMENTS

| 4,413,894 | 11/1983 | Miki et al. | 354/286 |
| 4,536,071 | 8/1985 | Maekawa et al. | 354/400 |
| 4,802,738 | 2/1989 | Ando et al. | 354/286 |

Primary Examiner—Russell E. Adams
Attorney, Agent, or Firm—Finnegan, Henderson, Farabow, Garrett, & Dunner

[57] ABSTRACT

An auto-focus camera of this invention has a focusing lens supporting feed screw rod supported substantially parallel to the lens optical axis and having a slit for focusing at its one end, and a spacer nut meshed with a feed screw portion of the feed screw rod, so that is longitudinal movement is prevented, and rotated by the focus control motor.

7 Claims, 7 Drawing Sheets

AUTO-FOCUS CAMERA

BACKGROUND OF THE INVENTION

1. Field of the Invention

The present invention relates to an auto-focus camera and, more particularly, to an auto-focus mechanism therefor.

2. Description of the Prior Art

As is well known, in a conventional auto-focus camera, a focusing lens is guided in a direction parallel to a lens optical axis by a guide groove or a guide rod, and is moved along the lens optical axis by a moving member driven by a focus control motor through a multistage reduction gear train.

Therefore, in the structure of the auto-focus camera, since a reduction gear ratio of the linear movement of the moving member to the rotation of the focus control motor becomes very high, a large number of reduction gears must be used in order to obtain such a reduction gear ratio. In this structure, since the guide member and the moving member of the focusing lens are separated by a given distance, a mechanical play or deformation thereamong causes an extension error along the lens optical axis of the focusing lens. Since the moving direction of the moving member is not adjusted with respect to the lens optical axis, an error in the moving direction of the moving member is directly reflected in the extension error of the focusing lens. In this structure, during adjustment after camera assembly, focusing must be performed so that the position of the focusing lens is adjusted to an infinite focal point. For the purpose of focusing, a plurality of adjusting screws are arranged between the focusing lens and a lens holding frame for holding it. Since these adjusting screws are assembled, an assembly of the focusing lens is complicated, and a lubricant may be attached to the surface of the focusing lens, thus contaminating the focusing lens.

In the auto-focus camera of this type, in order to cause the optical axis of the focusing lens to coincide with the lens optical axis, a fine-adjustment means for the guide member must be arranged.

In other words, in an auto-focus mechanism of the conventional auto-focus camera, a large number of components are required to obtain a high reduction gear ratio and to adjust the optical axis of the focusing lens. A space for assembling these components is required, resulting in high manufacturing cost.

Some auto-focus cameras of this type adopt a structure wherein when a camera is rendered inoperative, an exposure window formed in the front surface of the lens barrel of a photographing lens is automatically covered by a barrier plate so as to protect an internal lens and a mechanism section. The conventional barrier plate is biased in an open direction in a plane perpendicular to the lens optical axis. More specifically, the barrier plate is assembled in the lens barrel of the photographing lens to be movable in the plane mentioned above while being biased in the open direction by a spring, and is forcibly closed by a retracting operation of the lens barrel of the photographing lens upon turning off of a main switch.

Therefore, in the conventional lens barrel of the photographing lens, a space for escaping the barrier plate when it is open must be formed in the radial direction of the photographing lens, and a mechanism for forcibly closing the barrier plate is assembled between a camera body and the lens barrel of the photographing lens. Therefore, the outer dimensions of the lens barrel of the photographing lens become large as compared with the diameter of the exposure window or the photographing lens. Thus, it is difficult to obtain a structure with a high product quality. In this structure of the lens barrel of the photographing lens, while the main switch is kept ON, since the barrier plate is kept open, the photographing lens cannot be satisfactorily protected. If the barrier plate is closed for some reason, an operator cannot know this. Thus, the operator away often perform a photographing operation in this state. In this structure, if the operator turns off the main switch without noticing that a foreign matter is jammed between the exposure window and the barrier plate, the moving mechanism of the barrier plate which is forcibly closed is excessively loaded, thus breaking the barrier plate.

SUMMARY OF THE INVENTION

It is a first object of the present invention to provide an auto-focus camera which has simple guide and drive systems of a focusing lens, and has a structure capable of facilitating a focusing operation.

It is a second object of the present invention to provide an auto-focus camera which is constituted by a small number of components, can reduce manufacturing cost, and can minimize an extension error of a focusing lens.

It is a third object of the present invention to provide an auto-focus camera which has a small lens barrel of a photographing lens, can open a barrier member as needed to satisfactorily protect the photographing lens therein, can detect a malfunction of the barrier member in advance, and can prevent an operating mechanism of the barrier member from being excessively loaded.

DETAILED DESCRIPTION OF THE PREFERRED EMBODIMENT

A preferred embodiment of the present invention will be described hereinafter with reference to the accompanying drawings.

Figure 1:
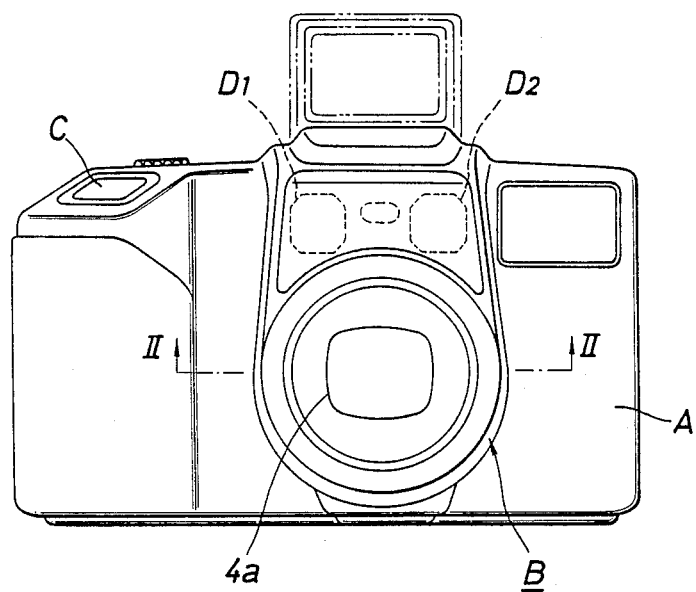
FIG. 1 is a front view of an auto-focus camera according to the present invention.

FIG. 1 is a front view showing an auto-focus camera according to the present invention. The camera shown in FIG. 1 has a lens barrel B of a photographing lens arranged on the front surface of a camera body A. A focusing unit for measuring a focal length to an object to be measured is arranged on the upper portion of the lens barrel B. More specifically, the focusing unit as a known structure comprises a light-emitting module $D_1$ for emitting a laser beam to an object at a first stroke of a release button C, and a light-receiving module $D_2$ for calculating the focal length to the object in accordance with a reflection angle of the laser beam. The position of a focusing lens 1 is adjusted in accordance with the focal length calculated by the light-receiving module $D_2$.

Figure 2:
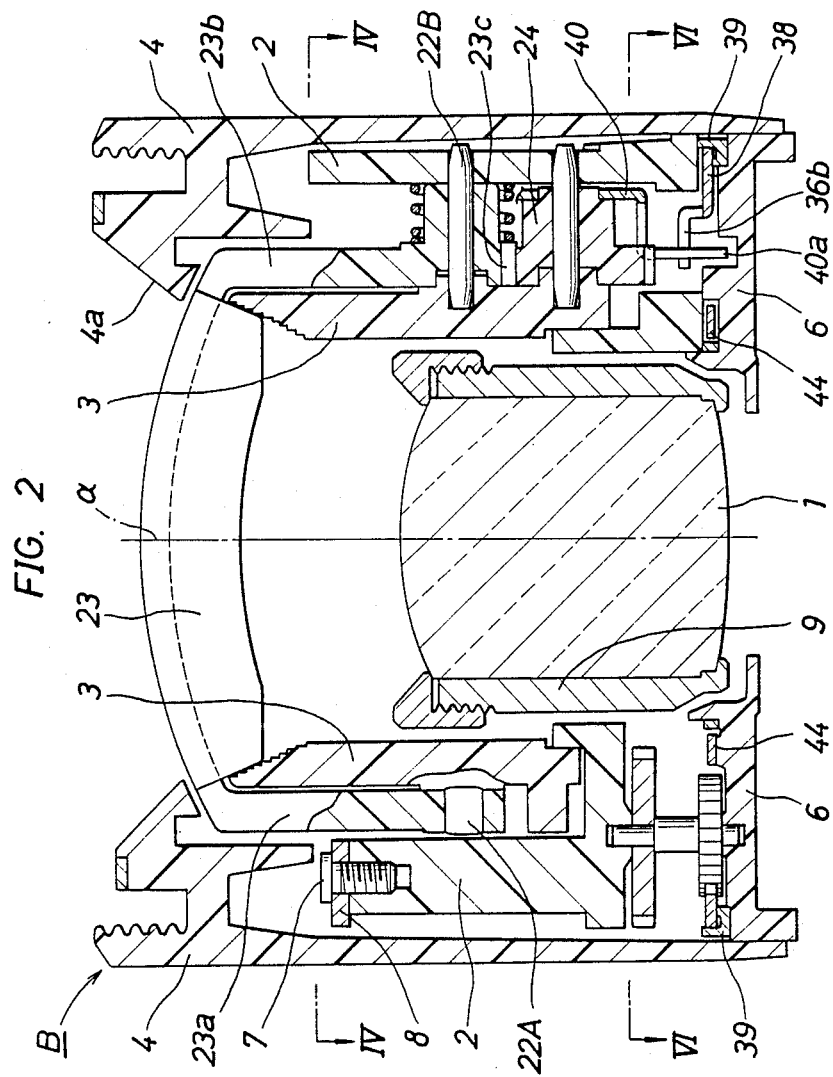
FIG. 2 is an enlarged sectional view taken along a line II—II in FIG. 1.
Figure 3:
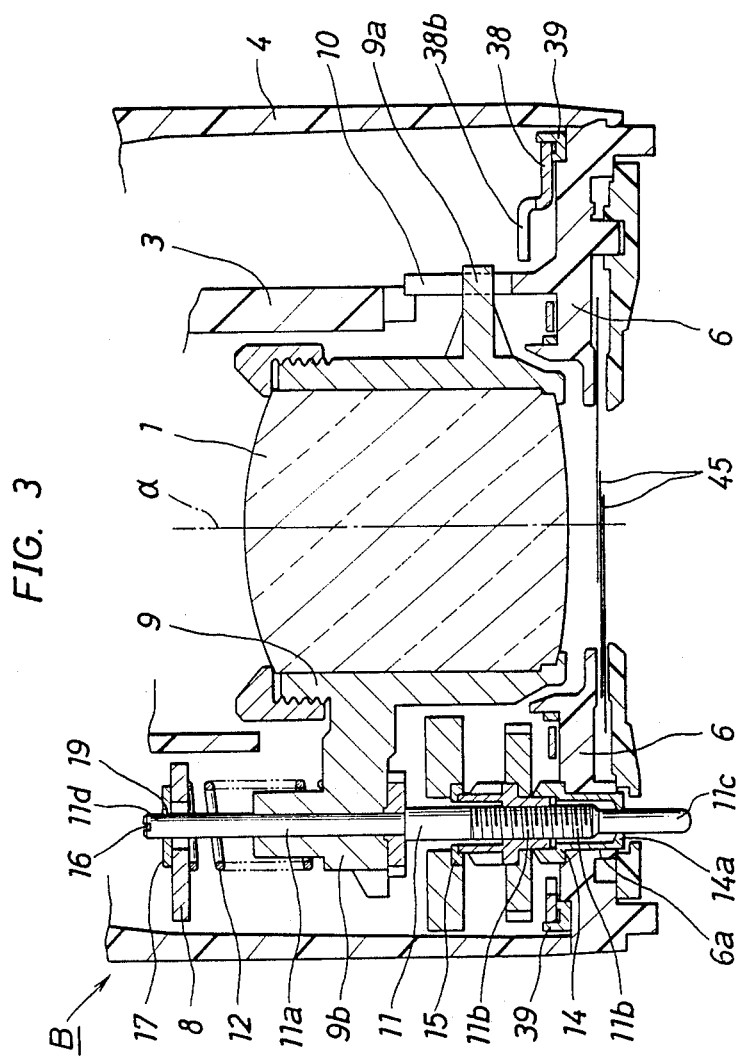
FIG. 3 is a sectional view taken along a line III—III in FIG. 4.

FIG. 2 is a sectional view taken along a line II—II of FIG. 1, and showing the lens barrel B described above. The lens barrel B comprises a large-diameter first lens barrel member 2 which is arranged concentrically with a lens optical axis $\alpha$ of the focusing lens 1, and a small-diameter second lens barrel member 3 assembled in the first lens barrel member 2. The first lens barrel member 2 is covered with a decorative cylinder 4 having an exposure window 4a formed at its distal end portion. A first base 6 is fixed to the base end portion of the first lens barrel member 2 by a set screw 5 shown in FIG. 7. A semi-arcuated second base (mounting plate) 8 is fixed to the distal end face of the first lens barrel member 2. A lens holding frame 9, movable along the lens optical axis $\alpha$, for holding the focusing lens 1, is arranged inside the second lens barrel member 3. As can be seen from FIG. 3, a sliding projection 9a of the lens holding frame 9 is slidably inserted in a guide groove 10 of the first lens barrel member 2, which extends in a direction parallel to the lens optical axis $\alpha$. The lens holding frame 9 has a base end portion 9b. The base end portion 9b is fitted on a shaft portion 11a of a feed screw rod 11 which is supported between the focusing lens 1 and the second base 8 to be movable in the longitudinal direction while extending in a direction substantially parallel to the lens optical axis $\alpha$. A biasing spring 12 for biasing the feed screw rod 11 and the lens holding frame 9 in one direction to eliminate a positional error due to backlash is interposed between the base end portion 9b and the second base 8. More specifically, as can be understood from FIGS. 3 and 7, the feed screw rod 11 has a feed screw portion 11b neighboring the shaft portion 11a in its longitudinal direction. A female threaded portion 13a of a spacer nut 13 is threadably engaged with the feed screw portion 11b. The two end portions of the spacer nut 13 are supported by a thrust bearing 14 fitted in a mounting hole 6a of the first base 6, and a bearing ring 15 of the first lens barrel member 2 so as to prevent its longitudinal movement. The thrust bearing 14 has a pivot portion 14a for pivotally supporting a distal end portion 11c of the feed screw rod 11. A slot 16 for a tool such as a screw driver during focusing is formed in a head portion 11d of the feed screw rod 11 on a side opposite to the distal end portion 11c.

Figure 4:
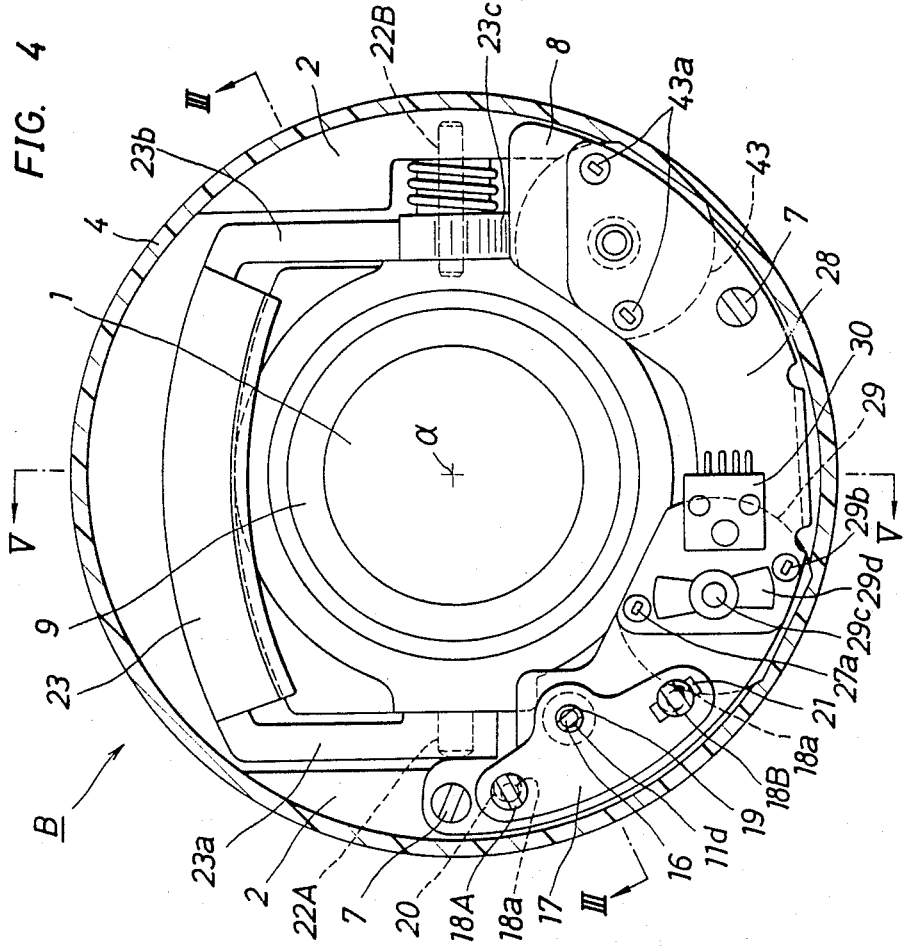
FIG. 4 is a sectional view taken along a line IV—IV in FIG. 2.
Figure 7:
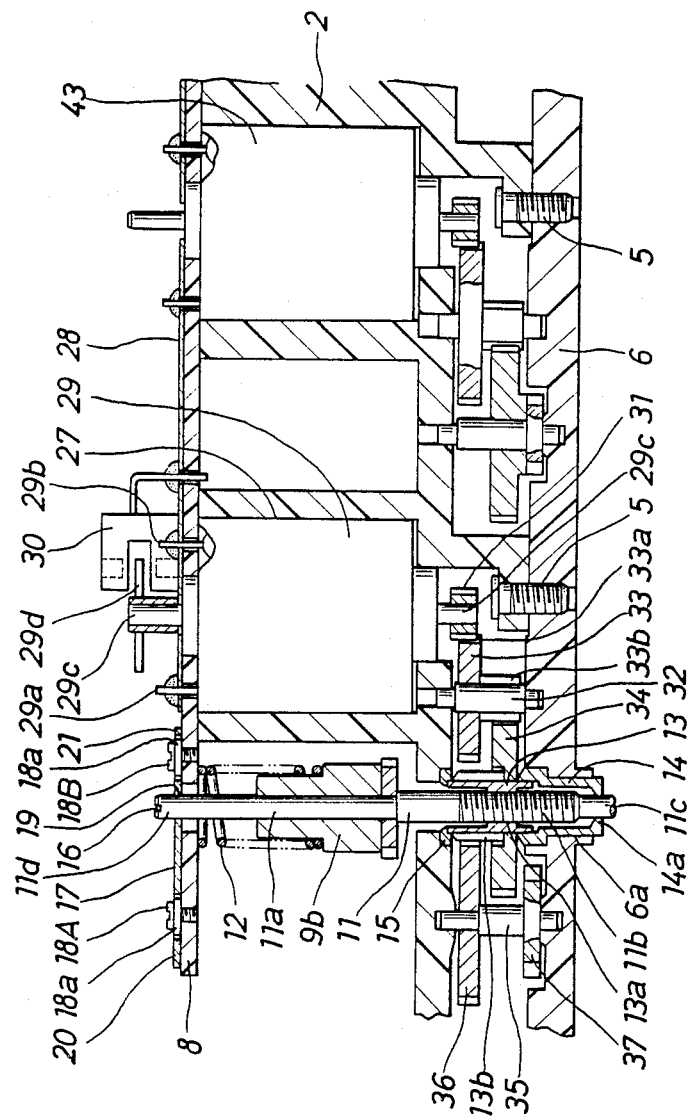
FIG. 7 is an exploded sectional view taken along a line VII—VII in FIG. 6.

The head portion 11d of the feed screw rod 11 is supported on an optical axis adjusting plate 17, which is mounted on the second base 8 so as to allow position adjustment. More specifically, the optical axis adjusting plate 17 fixed on the surface of the second base 8 by pair of eccentric cam screws 18A and 18B shown in FIGS. 4 and 7 is located in a plane perpendicular to the lens optical axis $\alpha$. The optical axis adjusting plate 17 has a through hole 19 having the same diameter as that of the head portion 11d of the feed screw rod 11. Eccentric cams 18a of the corresponding eccentric cam screws 18A and 18B are located in a circular hole 20 and an elongated hole 21 of the optical axis adjusting plate 17. Thus, when these eccentric cam screws 18A and 18B are rotated by a screw driver or the like, the feed screw rod 11 can be slightly inclined about the pivot portion 14a.

Referring again to FIG. 2, the front end of the second lens barrel member 3, i.e., the exposure window 4a, is covered with a semi-spherical barrier member 23 which is opened/closed about barrier rotational shafts 22A and 22B in a plane perpendicular to the lens optical axis a. Arm portions 23a and 23b at the two ends of the barrier member 23 are inserted in a space defined between the first and second lens barrel members 2 and 3 from the distal end side of the lens barrel B. These arm portions 23a and 23b are pivotally supported on the second lens barrel member 3 by the pair of barrier rotational shafts 22A and 22B extending in the radial direction of the focusing lens 1. The barrier member 23 is opened/closed by a barrier open/close gear 24 which is meshed with a gear 23c of one arm portion 23b.

Figure 5:
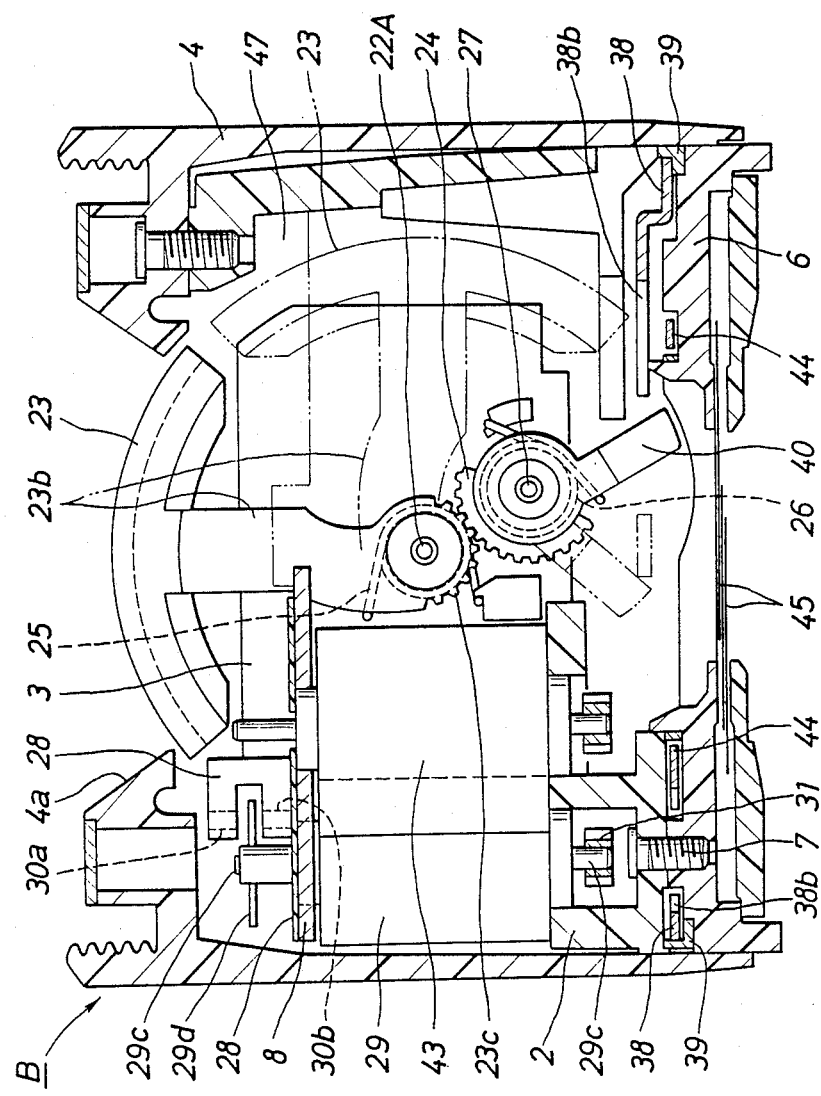
FIG. 5 is a sectional view taken along a line V—V in FIG. 4.

A driven lever 40 which is driven by an open/close projection 38b of a barrier open/close ring (opening/closing member) 38 (to be described later in detail) is fixed to the barrier open/close gear 24. As shown in FIG. 5, return springs 25 and 26 are engaged with the arm portion 23b of the barrier member 23 and the driven lever 40, respectively. The barrier member 23 is biased by the return spring 25 in an opening direction, i.e., clockwise in FIG. 5. The barrier open/close gear 24 is biased counterclockwise in FIG. 5 about a support pin 27 by the return spring 26. Therefore, when the gear 24 is disengaged from the open/close projection 38b of the barrier open/close ring 38, the driven lever 40 is returned to a state indicated by the solid line in FIG. 5.

The spacer nut 13 and the barrier open/close gear 24 described above are driven by a focus control motor 29. The focus control motor 29 is fitted in a mounting space 27 formed in the first lens barrel member 2 so as not to be rotated, and has external connection terminals 29a and 29b connected to a flexible printed circuit board 28 fixed on the surface of the second base 8, as shown in FIG. 7. More specifically, a slit disc 29d passing by a photointerrupter 30 arranged on the surface of the flexible printed circuit board 28 is fixed to a driving shaft 29c of the focus control motor 29. The number of revolutions o the motor 29, i.e., the moving distance of the focusing lens 1 along the lens optical axis o, is monitored based on a signal from the photointerrupter 30. A driving pinion 31 fixed to the driving shaft 29c of the focus control motor 29 is meshed with a large-diameter gear 33a of a first reduction gear 33, which is fixed to an intermediate axis 32 which is axially supported between the first base 6 and the first lens barrel member 2. A small-diameter gear 33b of the first reduction gear 33 is meshed with a second reduction gear 34 formed integrally with the spacer nut 13. The spacer nut 13 is rotated by the second reduction gear 34, so that the feed screw rod 11, which is prevented from being rotated as described above, is fed in its longitudinal direction. The spacer nut 13 has a driving gear 13b. The driving gear 13b is meshed with a third reduction gear 36 fixed to a joint shaft 35 supported between the first base 6 and the first lens barrel member 2 in the same manner as the intermediate axis 32. The barrier open/close ring 38 is rotated by the driving gear 37 fixed to the joint shaft 35.

Figure 6:
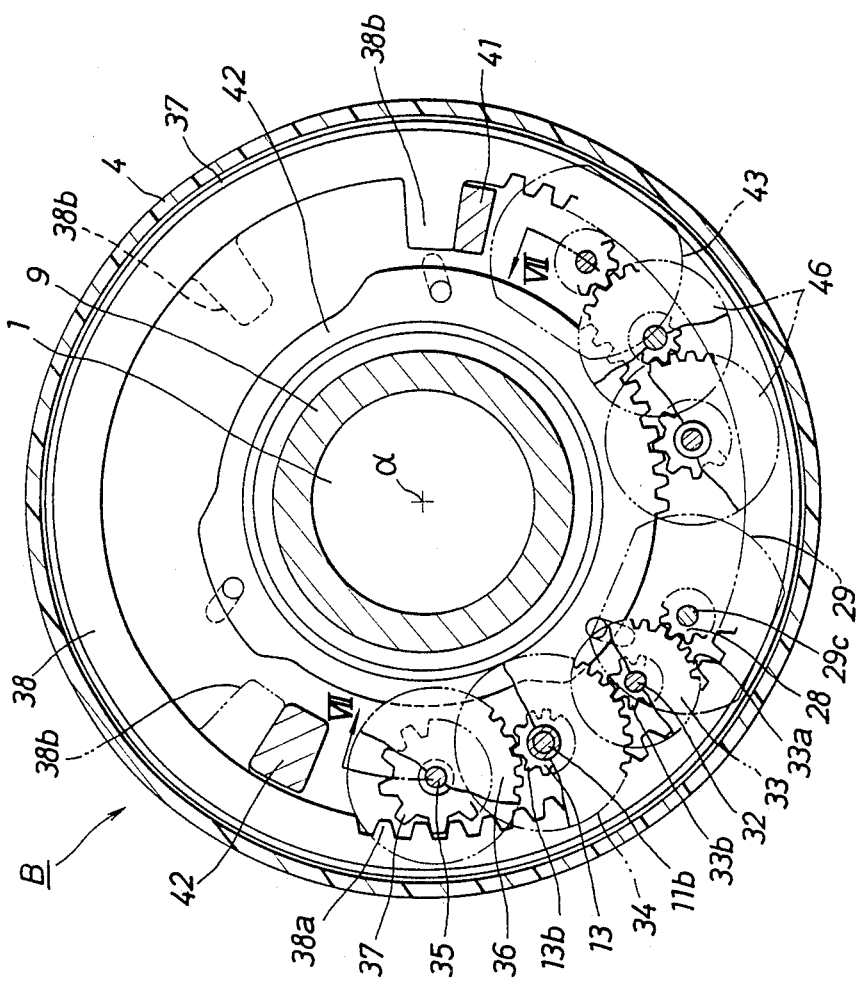
FIG. 6 is a sectional view taken along a line VI—VI in FIG. 2.

As can be seen from FIG. 6, the barrier open/close ring 38 can be rotated about the lens optical axis $\alpha$ along a guide ring 39 fixed to the surface of the first base 6. An inner peripheral gear 38a meshed with the driving gear 37 is locally formed on the inner circumferential surface of the ring 38. An open/close projection 38b facing a driven end 40a of the driven lever 40 formed integrally with the gear 38 is molded on a portion of the ring 38 neighboring the inner peripheral gear 38a. Initial and reference position stoppers 41 and 42 formed by portions of the first base 6 are arranged along a moving path of the open/close projection 38b, as shown in FIG.

6. When the open/close projection 38b of the barrier open/close ring 38 collides against the initial position stopper 41 and is located at a position indicated by the solid line in FIG. 6, the barrier member 23 is completely closed and is located at a closed position shown in FIG. 2. When the open/close projection 38b collides against the reference position stopper 42 and is located at a position indicated by an imaginary line in FIG. 6, the focusing lens 1 is located at the reference position. When the open/close projection 38b of the barrier open/close ring 38 is pivoted from the initial position to a boundary position indicated by a broken line in FIG. 6, the barrier member 23 reaches the open position shown in FIG. 4.

Note that reference numeral "43" denotes a reversible shutter control motor which comprises a DC motor. The motor 43 starts a rotation in response to a signal from the release button C, causes a shutter ring 44 to open sectors 45, and reverses the shutter ring 44 to close the sectors 45 after the lapse of a time determined by an AE mechanism.

Since the auto-focus camera according to the illustrated embodiment has the structure described above, the infinite focal point position can be easily adjusted using the slot 16 formed in the head portion 11d of the feed screw rod 11 during the focusing operation after the camera assembly. More specifically, when the open/close projection 38b of the barrier open/close ring 38 is held at the position indicated by an alternate long and two short dashed line in FIG. 6, the barrier member 23 is completely opened. Therefore, the head portion 11d of the feed screw rod 11 is rotated by the screw driver while the projection 38b is kept abutted against the reference position stopper 42 and the focal length of the focusing lens 1 is monitored. Thus, the shaft portion 11a of the feed screw rod 11 and the base end portion 9b of the lens holding frame 9 are slid relative to each other, and hence, the feed screw rod 11 is rotated. Therefore, since the feed screw portion 11b of the feed screw rod 11 is engaged with the female threaded portion 13a of the spacer nut 13, the feed screw rod 11 is slightly moved in a direction parallel to the lens optical axis α, i.e., along its longitudinal direction, and the lens holding frame 9 supported by the rod 11 is finely adjusted in the direction of the lens optical axis α, thus determining the infinite focal point position of the focusing lens 1.

During the focusing operation, the optical axis of the focusing lens can be set to perfectly coincide with the lens optical axis α. More specifically, the distal end portion 11c of the feed screw rod 11 is pivotally supported by the pivot portion 14a of the thrust bearing 14, and the head portion 11d of the feed screw rod 11 is supported by the through hole 19 of the optical axis adjusting plate 17. When the eccentric cam screws 18A and 18B are rotated, the position of the optical axis adjusting plate 17 located in the plane perpendicular to the lens optical axis α is adjusted by the eccentric cams 18a located in the circular and elongated holes 20 and 21 of the optical axis adjusting plate 17. Therefore, the head portion 11d of the feed screw rod 11 and the optical axis of the focusing lens 1 supported by the feed screw portion 11b of the rod 11 are adjusted, so that the moving direction of the focusing lens 1 can be set to coincide with the lens optical axis α.

Furthermore, the semi-arcuated second base (mounting plate) 8 is arranged in the lens barrel B, the feed screw rod 11, the auto-focus camera, the shutter control motor 43, and the reduction gears 34 and 46 are mounted on the second base 8, and the barrier member 23 is housed in a housing space 47 (FIG. 5) formed on the opposite side to the second base 8, thus reducing the dimensions of the lens barrel B. The external connection terminals 29a and 43a of the focus and shutter control motors 29 and 43 need only be soldered onto the flexible printed circuit board 28 on which the photointerrupter 30 is arranged, so that the electrical connections and mechanical fixing of the motors 29 and 43 can be achieved at the same time. Thus, the assembly and electrical connection processes can be simplified, thus obtaining a structure allowing easy mass-production.

Upon actual photographing operation, the release button C is depressed to drive the focus control motor 29, so that the feed screw rod 11 is fed in its longitudinal direction by the spacer nut 13 through the first and second reduction gears 33 and 34. As a result, the lens holding frame 9 is moved from the reference position to the measured focal point position while passing by the infinite focal point position. More specifically, when the main switch is turned on, the focus control motor 29 is started, and the barrier open/close ring 38 is pivoted counterclockwise in FIG. 6 through the third reduction gear 36 and the driving gear 37 until its open/close projection 38b abuts against the reference position stopper 42. Therefore, during an approach time for which the focusing lens 1 is moved toward the reference position, the open/close projection 38b of the barrier open/close ring 38 is engaged with the driven lever 40, and the barrier member 23 is pivoted about the barrier rotational shafts 22A and 22B through the barrier open/close gear 24. As a result, the barrier member 23 is opened in a state illustrated in FIG. 4. During this interval, the number of revolutions of the focus control motor 29, i.e., the moving distance of the focusing lens 1 along the lens optical axis α, is monitored by the photointerrupter 30 for detecting the number of revolutions of the slit disc 29d. When a predetermined number of revolutions is not counted by the photointerrupter within a predetermined period of time, an erroneous operation is determined, and the auto-focus operation and the shutter operation are interrupted. Therefore, when the release button C is depressed, the focus control motor 29 is stopped at a position corresponding to the number of revolutions of the focus control motor 29 (corresponding to the moving distance of the focusing lens 1 according to a distance to an object) before the open/close projection 38b of the barrier open/close ring 38 is pivoted from the position indicated by the alternate long and two short dashed line in FIG. 5 to the position indicated by the broken line, thus completing the auto-focus operation. Then, the shutter control motor 43 is started, and the sectors 45 are reciprocated once for a time calculated by the AE mechanism. When the movement of the lens holding frame 9 is stopped by stopping the feed screw rod 11, the position of the lens holding frame 9 may be drifted by an amount corresponding to backlash between the feed screw portion 11b of the feed screw rod 11 and the the female threaded portion of the spacer nut 13 due to the inertia of the focusing lens 1 and the lens holding frame 9. However, the force of the biasing spring 12 in the illustrated structure acts only in the longitudinal direction of the feed screw rod 11, and there is no possibility that the lens holding frame 9 is inclined with respect to the lens optical axis α. Thus, the biasing force of the biasing spring 12 can be increased so as to prevent a focus point error due to the backlash.

After the shutter operation is completed, the focus control motor 29 is rotated in the reverse direction, and the barrier open/close ring 38 is returned until the open/close projection 38b abuts against the reference position stopper 42, thus winding up a film. When the main switch is turned off, the focus control motor 29 drives the barrier open/close ring 38. Therefore, the open/close projection 38b of the barrier open/close ring 38 is returned until it abuts against the initial position stopper 41, thus closing the barrier member 23.

In this case, when the barrier member 23 is returned in the closing direction, if a foreign matter is jammed between the barrier member 23 and the exposure window 4a, the barrier member 23 can be immediately closed after the foreign matter is removed. That is, when the focusing lens 1 is returned to the initial position, the barrier open/close ring 38 is returned independently of the driven lever 40 and the barrier member 23. In this case, since the open/close projection 38b of the barrier open/close ring 38 has already been escaped from the moving range of the driven lever 40, when the abnormality is removed, the barrier member 23 is returned to the closed position by the biasing forces of the return springs 25 and 26.

According to the present invention, since the nut rotation-controlled by the focus control motor and the feed screw rod threadably engaged with this nut are utilized as a drive/guide member, the reduction gear ratio of the reduction gears can be reduced, and the auto-focus mechanism can be simplified. Since the auto-focus mechanism according to the present invention can be arranged in a narrow space, the lens barrel of the photographing lens can be made compact. In addition, the focusing operation can be achieved by only operating the head portion of the feed screw rod by a tool such as a screw driver. Note that since the force of the biasing spring in the illustrated embodiment acts in the longitudinal direction of the feed screw rod, no excessive rotational moment acts on the lens holding frame of the focusing lens. As a result, the focusing lens can be kept in a stable position.

Since the barrier member having the center of rotation corresponding to the radial direction of the photographing lens is open/close-controlled by the opening/closing member driven by a rotation transmission system of the focus control motor, the dimensions of the lens barrel of the photographing lens can be reduced. According to the present invention, if the focusing lens and the opening/closing members are designed to be temporarily returned to their initial position after exposure, the barrier member can be closed for every photographing operation even if the main switch is kept ON.

Thus, the photographing lens and the like in the lens barrel of the photographing lens can be satisfactorily protected. According to the present invention, unless the barrier member is completely opened for some reason, the photographing operation can be automatically inhibited since the rotation of the focus control motor is monitored. If a foreign matter is jammed between the exposure window and the barrier member, the barrier member can be closed after the abnormality is removed.

What is claimed is:

1. An auto-focus camera for moving a focusing lens along a lens optical axis upon rotation of a focus control motor, comprising:
   a focusing lens supporting feed screw rod supported substantially parallel to the lens optical axis and having focusing means at its one end; and
   a spacer nut meshed with a feed screw portion of said feed screw rod, so that longitudinal movement thereof is prevented, and rotated by said focus control motor.

2. A camera according to claim 1, wherein the other end of said feed screw rod is pivotally supported, and optical axis adjusting means, which can adjust a position of said one end of said feed screw rod within a plane perpendicular to its axial direction by an external manual operation, is arranged near said one end of said feed screw rod.

3. A camera according to claim 1, wherein said one end of said feed screw rod is supported by a base fixed to a lens barrel of a photographing lens, and
   a focusing lens holding frame is fixed to said feed screw rod, a spring being arranged between said base and said holding frame around said feed screw rod.

4. A camera according to claim 1, wherein said focusing means arranged at said one end of said feed screw rod comprises a slot engaged with a screw driver.

5. A camera according to claim 1, further comprising:
   a barrier member which can close an exposure window formed in a front surface of a lens barrel of a photographing lens;
   an opening/closing member, driven by said focus control motor, for, when said focusing lens is located outside a focus range, closing said barrier member; and
   holding means for, when said opening/closing member is escaped toward the focus range, holding said barrier member at an open position.

6. A camera according to claim 5, wherein said barrier member has a rotational shaft extending along a radial direction of said photographing lens.

7. A camera according to claim 5, wherein said barrier member is biased in an opening direction.

* * * * *